(12) United States Patent
Green et al.

(10) Patent No.: US 12,030,107 B2
(45) Date of Patent: Jul. 9, 2024

(54) VERSATILE BASE FOR CAN NECKING SYSTEM

(71) Applicant: BELVAC PRODUCTION MACHINERY, INC., Lynchburg, VA (US)

(72) Inventors: Dennis E. Green, Lynchburg, VA (US); Larry D. McKinney, Lynchburg, VA (US); Jeffrey L. Shortridge, Lynchburg, VA (US)

(73) Assignee: BELVAC PRODUCTION MACHINERY, INC., Lynchburg, VA (US)

( * ) Notice: Subject to any disclaimer, the term of this patent is extended or adjusted under 35 U.S.C. 154(b) by 592 days.

(21) Appl. No.: 17/284,416

(22) PCT Filed: Oct. 7, 2019

(86) PCT No.: PCT/US2019/055057
§ 371 (c)(1),
(2) Date: Apr. 9, 2021

(87) PCT Pub. No.: WO2020/076733
PCT Pub. Date: Apr. 16, 2020

(65) Prior Publication Data
US 2021/0354192 A1    Nov. 18, 2021

Related U.S. Application Data

(60) Provisional application No. 62/744,186, filed on Oct. 11, 2018.

(51) Int. Cl.
*B21D 51/26* (2006.01)
(52) U.S. Cl.
CPC ..... *B21D 51/2692* (2013.01); *B21D 51/2638* (2013.01)

(58) Field of Classification Search
CPC . B21D 51/26; B21D 51/2692; B21D 51/2638
See application file for complete search history.

(56) References Cited

U.S. PATENT DOCUMENTS 5,553,826 A * 9/1996 Schultz .............. B21D 51/2615
                                                           248/678
5,611,231 A * 3/1997 Marritt ............... B21D 51/2692
                                                           72/94

FOREIGN PATENT DOCUMENTS

CN        203092139 U     7/2013
DE        27 03 252 A1    8/1978
(Continued)

OTHER PUBLICATIONS

International Search Report and Written Opinion in International Patent Application No. PCT/US2019/055057, dated Jan. 17, 2020 (10 pages).

*Primary Examiner* — Teresa M Ekiert
(74) *Attorney, Agent, or Firm* — NIXON PEABODY LLP

(57) ABSTRACT

A symmetric, modular base for a can processing system. The base includes a leg portion comprising a plurality of openings adapted for receiving at least one of a transfer star wheel and a turret mechanism configured to perform a working operation on an article. The base further includes a first foot portion extending from a first side of the leg portion. The base further includes a second foot portion extending from the second side of the leg portion. The base further includes a plurality of openings in the first foot portion and the second foot portion, the plurality of openings of the first and second foot portion providing access to an interior portion of the base. The base is generally symmetric about a center line drawn vertically through a midpoint of the leg portion of the base between the first foot portion and the second foot portion to allow for mounting of components on either a first side or a second side of the base.

12 Claims, 14 Drawing Sheets

(56) References Cited

FOREIGN PATENT DOCUMENTS

| DE | 103 27 018 B3 | 10/2004 |
|---|---|---|
| WO | WO 96/033032 A1 | 10/1996 |
| WO | WO 98/011379 A1 | 3/1998 |

\* cited by examiner

VERSATILE BASE FOR CAN NECKING SYSTEM

CROSS-REFERENCE TO RELATED APPLICATIONS

This application is a U.S. National Stage Application of International Application No. PCT/2019/055057, filed Oct. 7, 2019, which claims priority to and benefit of U.S. Provisional Patent Application Ser. No. 62/744,186, filed Oct. 11, 2018, both of which are hereby incorporated by reference herein in their entireties.

FIELD

The present invention relates generally to the field of equipment for can processing systems. More specifically, the invention relates to a symmetric base that allows parts to be mounted on either face of the base.

BACKGROUND

Necker systems are typically referred to as having a rotation. Rotation is defined by observing container (e.g., can) travel from the side of the system facing the closed, dome end of the can (the side opposite the open end of the can or "operator side"). When observing the dome end of the can, cans flowing left to right are produced by a "Normal Rotation" machine. Cans flowing from right to left are said to be produced by a "Reverse Rotation" machine.

Conventional machine arrangements include a modular base on which all other components of the system (e.g., shafts, guards, etc.) are mounted. Conventional machine arrangements are typically designated as either "handed" or rotation specific. For example, conventional bases are typically designated as "right hand," "left hand." "normal rotation," or "reverse rotation." Moreover, can necking equipment is installed on a fixed based platform in either a "normal" or "reverse" rotation orientation with a single multistate weldment as the base. Such systems can be installed by rotating the entire system as appropriate and locating infeed and discharge positions to match. These systems thus require that mating parts be mounted to only one specific face and that the entire system be reconfigured depending on whether a "normal" rotation or a "reverse" rotation system is needed, which can be inconvenient, time-consuming, expensive, and/or cumbersome.

It would be desirable to have a modular base that addresses one or more of these disadvantages.

SUMMARY

One exemplary embodiment of the invention relates to a symmetric, modular base for a can processing system. The base includes a leg portion comprising a plurality of openings adapted for receiving at least one of a transfer star wheel and a turret mechanism configured to perform a working operation on an article. The base further includes a first foot portion extending from a first side of the leg portion. The base further includes a second foot portion extending from the second side of the leg portion. The base further includes a plurality of openings in the first foot portion and the second foot portion, the plurality of openings of the first and second foot portion providing access to an interior portion of the base. The base is generally symmetric about a center line drawn vertically through a midpoint of the leg portion of the base between the first foot portion and the second foot portion to allow for mounting of components on either a first side or a second side of the base.

Another exemplary embodiment of the invention provides a machine arrangement which operates on a plurality of articles. The machine arrangement includes a plurality of machines arranged to cooperate with each other in a manner to form a machine arrangement. Each machine in the plurality of machines includes a transfer star wheel, a turret mechanism configured to perform a working operation on an article, and a symmetric, modular base having a first side and a second, generally opposing side. Each of the first and second sides having apertures for receiving at least a portion of the transfer star wheel and the turret mechanism. The base is symmetric about a center line drawn vertically through a midpoint of the base between the first side and the second side to allow for receiving the transfer star wheel and the turret mechanism in the aperture on either the first side or the second side of the base.

It is to be understood that both the foregoing general description and the following detailed description are exemplary and explanatory only and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

DETAILED DESCRIPTION

Machines or machine modules may be used to form, process or otherwise perform a working action on an article.

In a machine line, an article is first fed into a first machine by an infeed mechanism to fill pockets in a star wheel, such as an infeed star wheel or a turret star wheel. The articles are then passed to a transfer star wheel adjacent the turret. The articles are then passed from the transfer star wheel to a turret star wheel. While each article is in a pocket of the turret star wheel, a corresponding ram assembly moves tooling toward and away from the article to perform a working operation, such as necking.

The article is then passed from the turret star wheel to a transfer star wheel, which transfers the article to another machine in the machine line that will perform another stage of the working operation on the article. When all processing/necking stages are complete, the article is discharged from the machine line. The machine line may be a recirculated machine line, a linear line, or any other type of machine line.

Each transfer star wheel has any number of pockets to hold articles for processing or transfer. For example, the transfer star wheel may have twenty pockets, or any other suitable amount. It will be recognized that a star wheel is capable of having one station up to any suitable number of stations. The transfer star wheel may have the same amount of pockets as the turret star wheels. Alternatively, the transfer star wheels may have more pockets then the turret star wheels.

Figure 1:
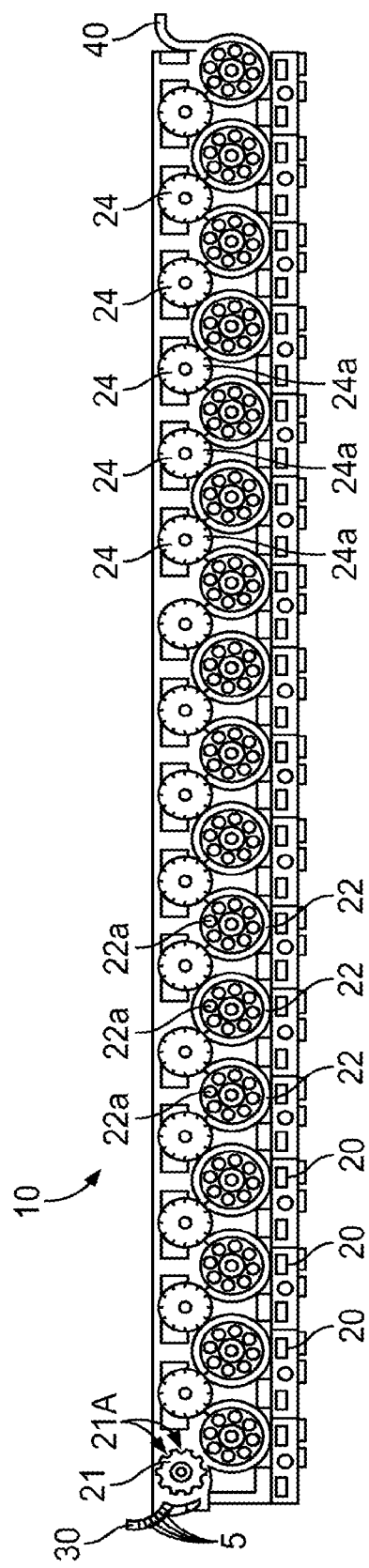
FIG. 1 is a schematic view of a machine line that incorporates an embodiment of the present invention.
Figure 2:
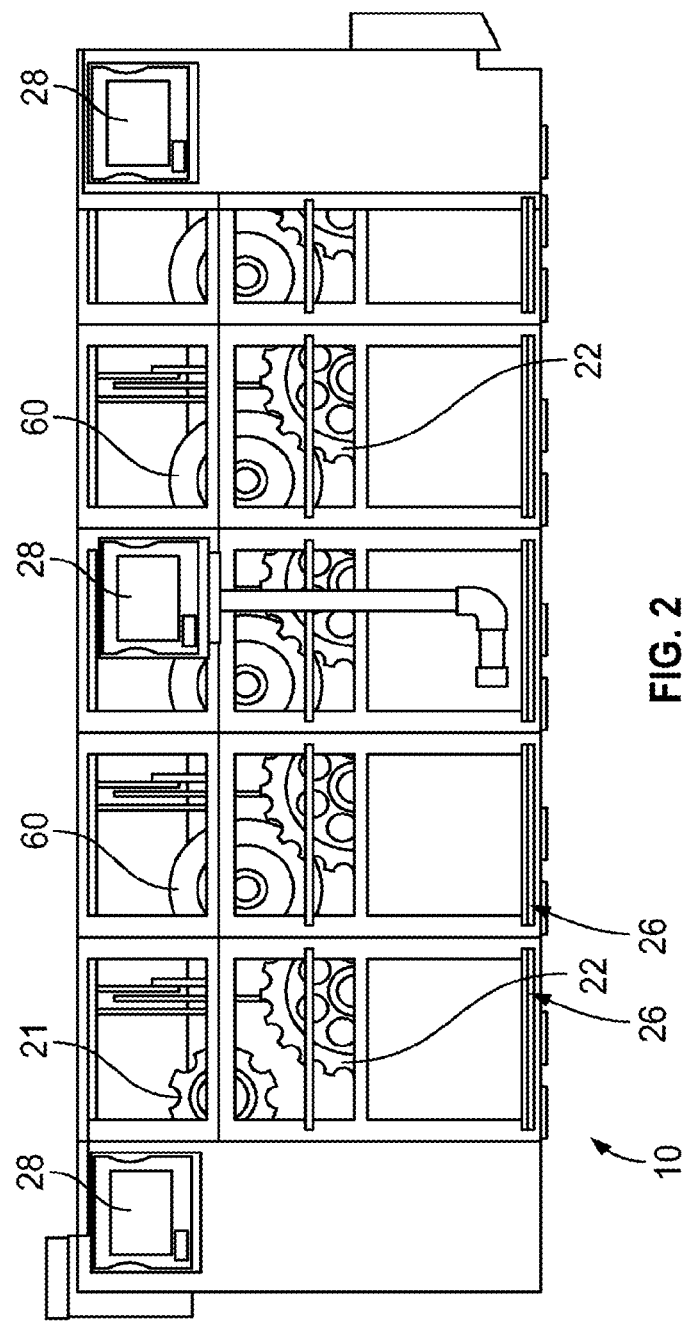
FIG. 2 is a front perspective view of a machine line illustrating user workstations and guard covers.

FIGS. 1 and 2 illustrate a machine arrangement 10, modules 20, and turret mechanisms 60 for the machine arrangement 10. The machine arrangement 10 is configured to perform a working operation on an article 5. The working operation may comprise, for example, necking, flanging, reprofiling, reforming, leak/light testing, or any other suitable working operation. The machine arrangement 10 may be configured to operate a single working operation or any suitable combination of working operations.

The article 5 may be a can, any suitable food or beverage container, jar, bottle or any other suitable article. The article 5 has an open end, an opposing closed end, and a sidewall extending from the open end to the closed end. Alternatively, the article 5 may be open at both ends. A top, lid, or other closure may be added to the article 5 during an operation in the machine arrangement 10 or at a later stage. For exemplary purposes only, the below description will describe the mechanisms and methods for use on a can 5. It will be recognized that any other type of article (such as those described above) may be used.

Embodiments of the invention relate to devices and modules for use in can making machinery. In the non-limiting embodiments described below, the devices and modules are shown and described with respect to a necking processes. However, it is contemplated that the devices and modules may be used with any suitable type of can processing machinery and processes including, but not limited to, can die necking, flanging, reprofiling, reforming, and leak/light testing machines. In the can necking process, the open end of a can 5 is reduced in diameter. In most cases, many reductions are required to complete the can necking process. In the flanging process, a flange is added to the open end of the can 5. The can 5 is pressurized with air to strengthen the body of the can 5 and resist the forces of necking, flanging, or any other working operation to stabilize and hold the can 5 in the proper position during the working/forming process.

FIG. 1 illustrates an embodiment of a machine arrangement or line 10. In the machine line 10, cans 5 are fed into the infeed mechanism 30. The cans 5 are then passed to pockets 21a in the infeed transfer star wheel 21, which then passes the cans to corresponding pockets 22a in a transfer star wheel 22. From the transfer star wheel 22, the cans 5 are passed to pockets 24a in a turret star wheel 24. Alternatively, the infeed mechanism 30 may pass the cans 5 directly into a transfer star wheel 22 or turret star wheel 24 in a module 20. The cans 5 continue through the machine line 10 by passing through corresponding transfer star wheel pockets 22a and turret star wheel pockets 24a in the alternating transfer star wheels 22 and turret star wheels 24. In the pockets 24a of the turret star wheel 24, the can 5 undergoes a working operation (e.g., a necking operation). The turret star wheel 24 and transfer star wheel 22 and, thus, the cans 5, continuously rotate throughout the machine arrangement 10 as the cans 5 pass from one module 20 to the next module 20. At the end of the machine line 10, the cans 5 exit the machine line 10 via a discharge mechanism or path 40.

The use of modules 20 allows for the machine line or arrangement 10 to be assembled and changed to provide as many forming stages as is required and to allow for adding or reducing stages such as flanging, necking, trimming, curling, threading, and/or base reforming/reprofiling stages, which may be added and/or removed as desired.

FIG. 2 illustrates an embodiment of a machine line 10 in which module guard covers (sometimes referred to as coverings or enclosures) 26 are shown closed over each module 20. The machine line 10 may include workstations or monitors 28 that enable an operator to control and monitor the machine line 10. The workstations 28 and guard covers 26 shown are illustrative examples only.

Figure 3A:
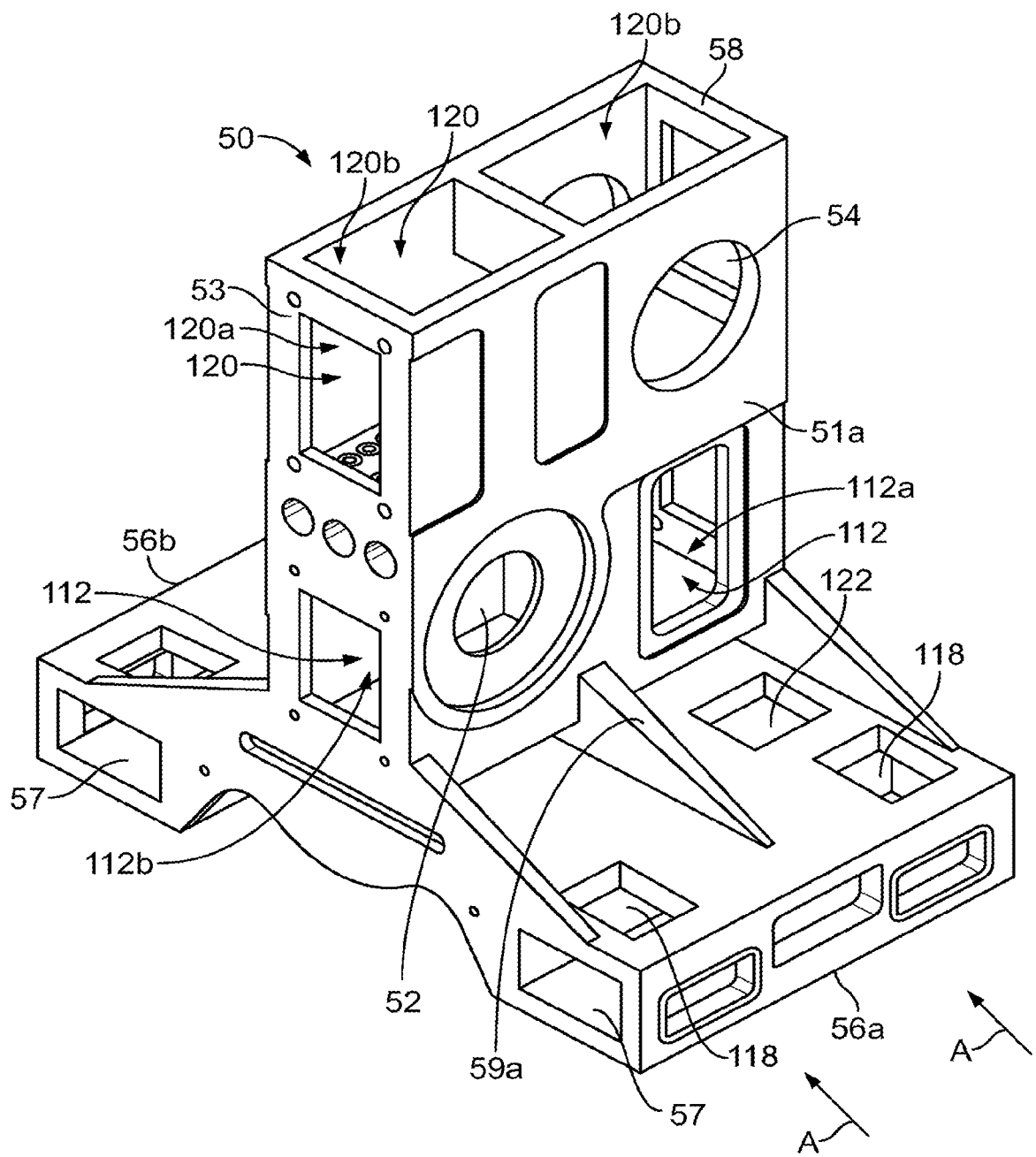
FIG. 3A is a perspective view of a first side of a symmetric base according to an embodiment of the invention.
Figure 3B:
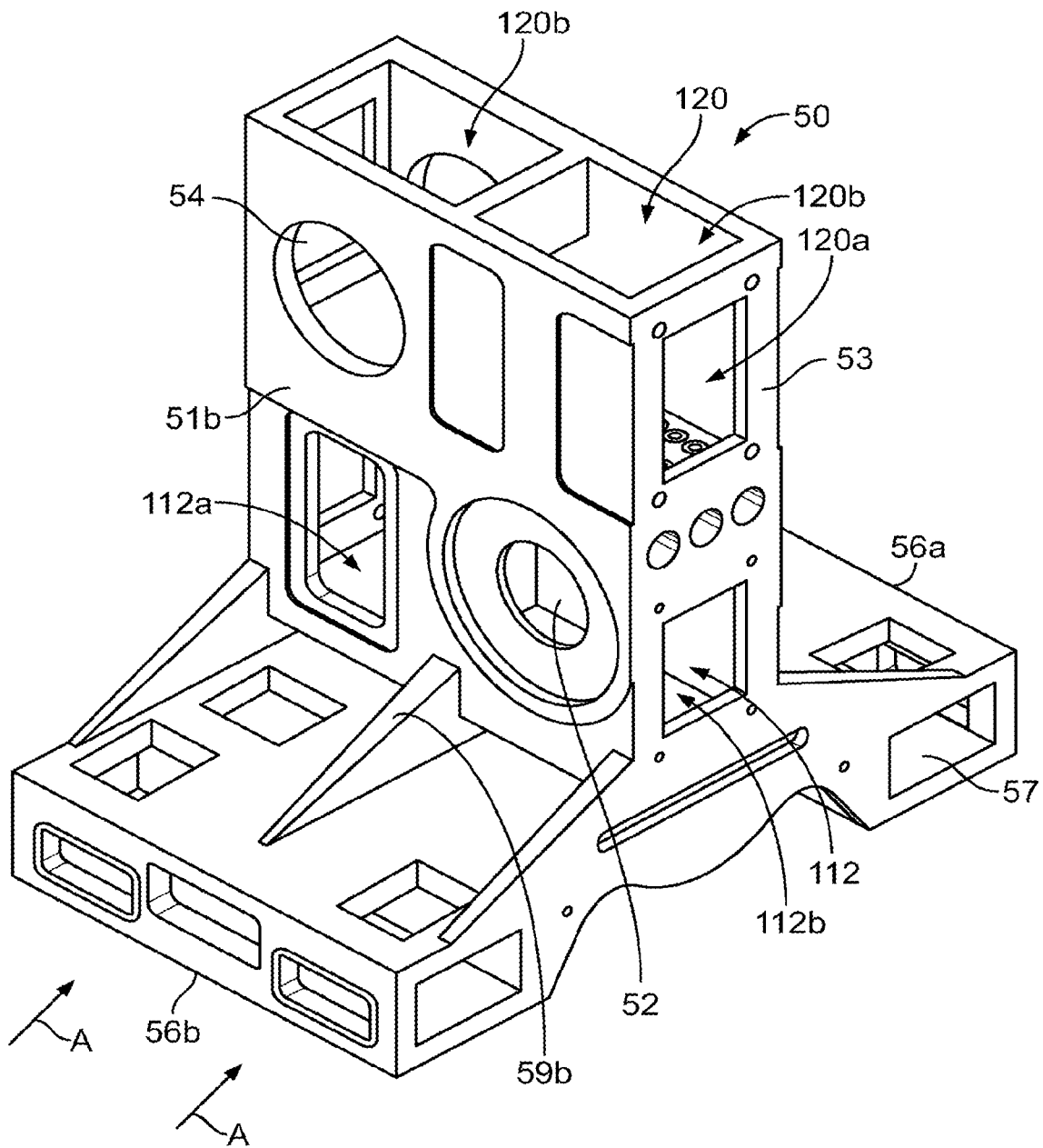
FIG. 3B is a perspective view of a second side of a symmetric base according to an embodiment of the invention.

Each module 20 includes a modular and interchangeable base 50, one embodiment of which is shown in FIGS. 3A and 3B. FIG. 3A illustrates a first, rear side 51a of the base 50 while FIG. 3B illustrates a second, front side 51b of the base 50. The base 50 is generally symmetrical about a center line drawn through the midpoint of the vertical section of the base between the first side 51a and the second side 51b, or between the first foot portion 56a and the second leg portion 56b (between the "operator side" face and the "drive side" face). In typical systems, the sides 51a and 51b would be described as "operator side" face and "drive side" face. However, the symmetry of the base 50 makes it possible to consider either side the front or the rear of the base, thus allowing mating parts to be mounted on either side 51a or 51b. For example, significant machine components including, but not limited to, working turrets, transfer turrets, guarding, and the like may be mounted to either side 51a, 51b of the base 50 or to components that communicate with the base 50. Passageways for air, electrical wiring, and other machine elements may also be provided within the base 50, as discussed in more detail below.

The base 50 includes a leg portion 58 and two foot portions 56a and 56b. The base 50 is configured to support a cantilevered turret 60 by, for example, the two foot portions 56a and 56b and two gussets 59a and 59b. The foot portions 56a and 56b and gussets 59a and 59b support the weight and arrangement of the turret 60 and/or a transfer star wheel 22. The gussets 59a and 59b extend upward from the foot portions 56a and 56b toward a respective side 51a, 51b of the leg portion 58, and according to one embodiment, are similarly shaped to a fin. A wide end of the gussets 59a and 59b is coupled to a respective side 51a, 51b of the leg portion 58 for support.

Figure 4:
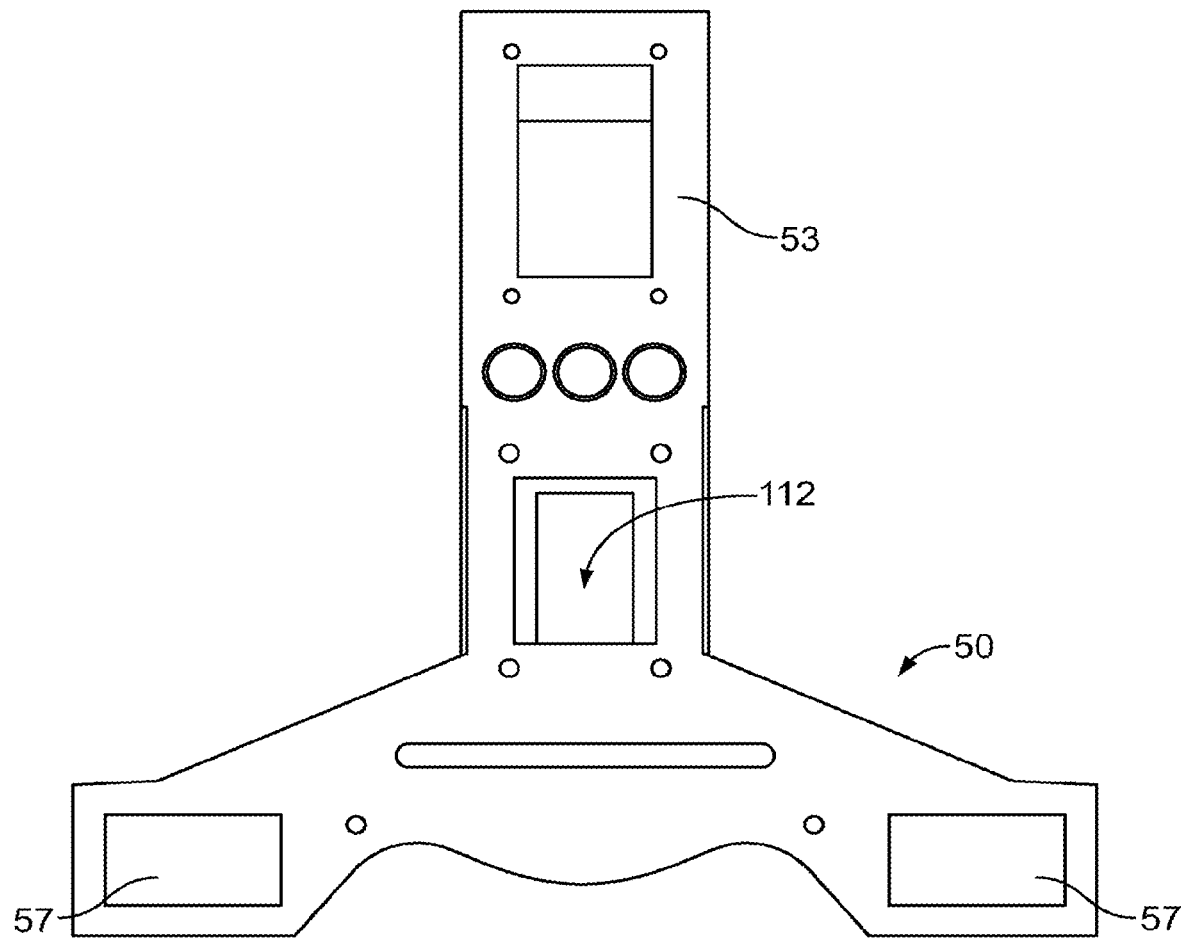
FIG. 4 is an end view of a symmetric base according to an embodiment of the invention.
Figure 6A:
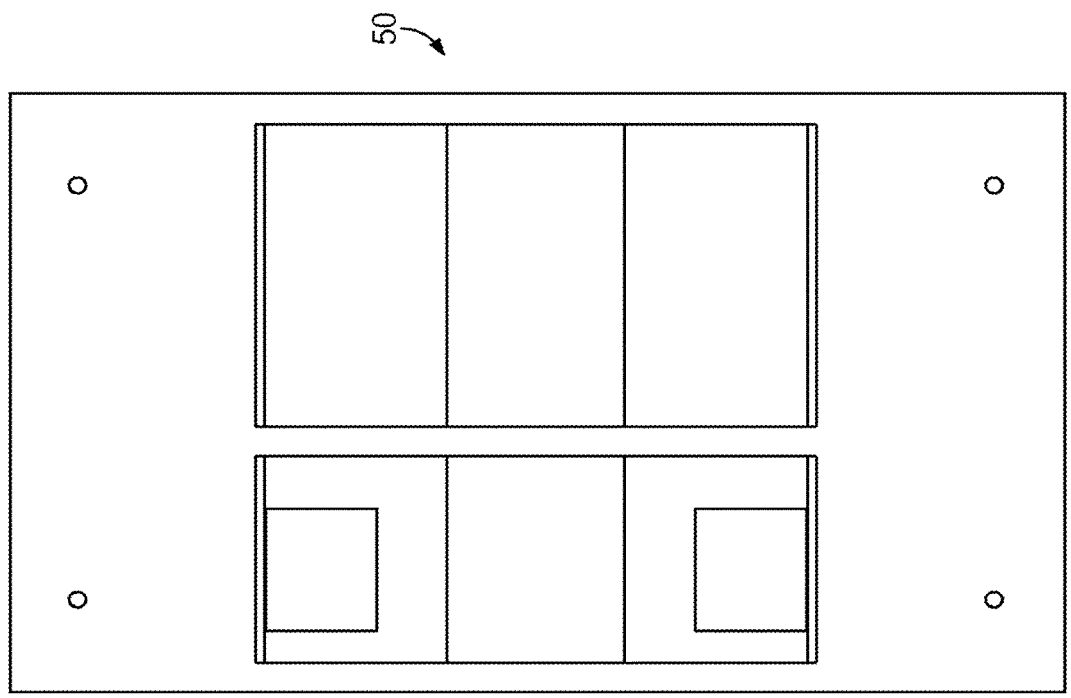
FIG. 6A is a bottom view of a symmetric base according to an embodiment of the invention.
Figure 5:
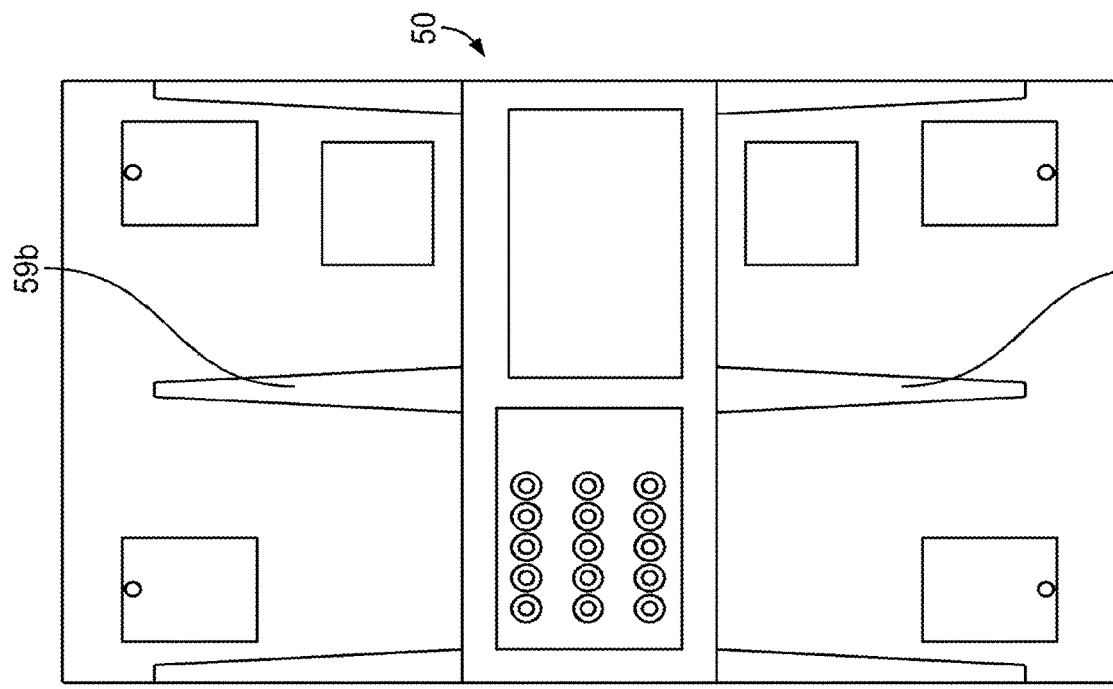
FIG. 5 is a top view of a symmetric base according to an embodiment of the invention.
Figure 6B:
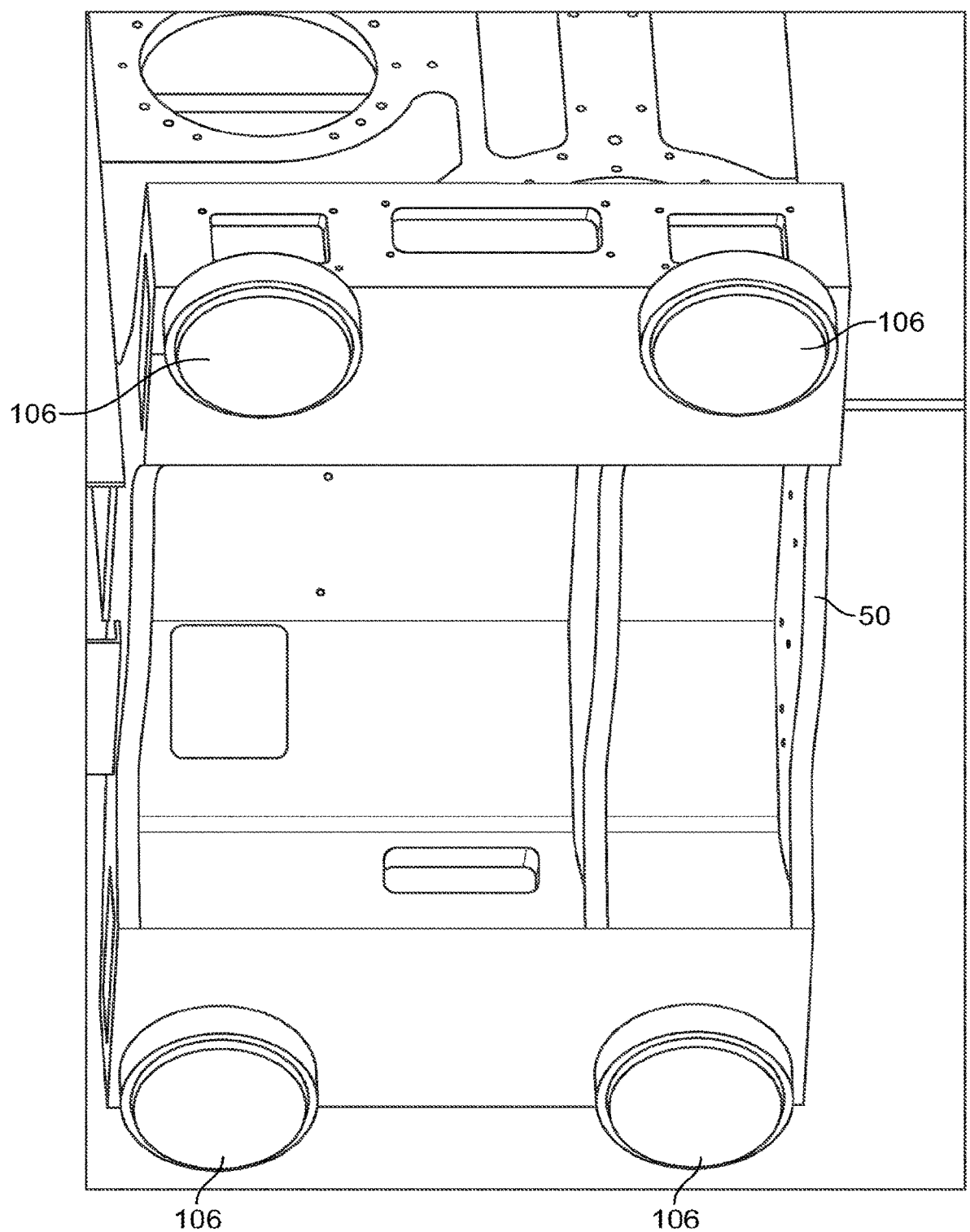
FIG. 6B is a bottom view of a symmetric base having isolator pads coupled thereto, according to one embodiment.

FIGS. 4, 5, and 6 illustrate various views of the base 50, including a view of a first end 53 (FIG. 4), a top view (FIG. 5), and a bottom view (FIG. 6). It should be noted that the different openings and components depicted in FIGS. 3A, 3B and 4-6 may vary depending on a particular use or need. Each foot portion 56a, 56b of the base 50, as shown in FIGS.

3A and 3B, includes a plurality of openings for providing access to an interior portion of the base. For example, the openings of the foot portions 56a, 56b may include, e.g., forklift openings 57, cast-in window openings 118, cable pass-through openings 122, any combinations thereof, or the like. Multiple forklift openings 57 are arranged and sized to permit forklift prongs to be inserted into the forklift openings 57 to lift the base 50. As can be seen, the forklift openings 57 may extend through each of the foot portions 56a and 56b to an opposite side of the base 50. The size, shape, amount, and placement of the forklift openings 57 are shown for exemplary purposes only and may be changed as appropriate for a specific use or need. Advantageously, in an assembled state, the forklift openings 57 may serve as air passages.

Figure 9A:
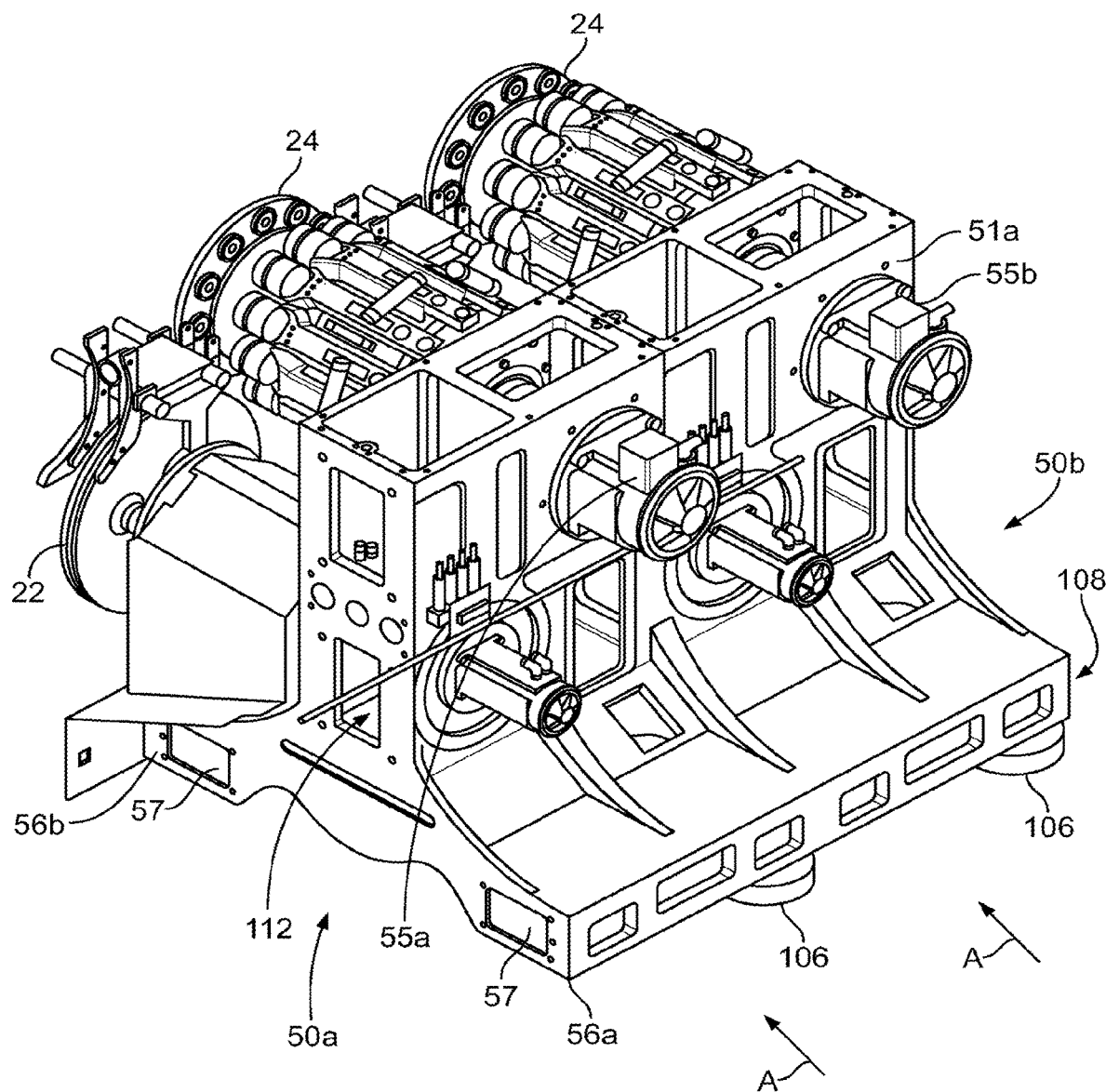
FIG. 9A is a perspective view of a pair of bases according to one embodiment.

Alternatively, the forks of the fork lift may fit under the base 50, as shown by the Arrows A of FIGS. 3A, 3B, where the forks need not be captured by the forklift openings 57. Referring to FIG. 9A, a fork lift may also be used to lift a pair of bases 50a, 50b from the first rear side 51a (e.g., the side opposite the transfer star wheel 22 and the turret mechanism 60).

According to one embodiment, a can evacuation system may be integrated into the base 50. During forming and inspection operations, cans are periodically unintentionally ejected from the machine's process and transfer turrets. These cans are commonly malformed, presented to the tooling improperly, simply "dropped" due to a loss of control, or the like. On occasion, a large number of cans may be unintentionally ejected in a chain reaction, causing a jam or wreck condition. These unintentionally ejected cans are pulled toward the floor by gravity. As they drop, the cans may strike sheet metal plates that help direct them to a channel of flowing air at the floor level. Air is provided in the channel with sufficient pressure and flow to move the cans along the floor toward the discharge of the machine where they are blown out of a chute for collection. A vacuum chamber 112 in the base 50 (see FIGS. 3A, 3B, 4) is used to contain and transport the flowing air until it reaches nozzles mounted on regularly spaced openings. The nozzles deliver the air to interact with the cans.

Referring back to FIG. 3A, there are several other important areas on and within the base 50 that may desirably have access thereto. These include, for example, the vacuum chamber 112 and an air manifold chamber 120. As shown in FIG. 3A, one or more cable pass-through openings 122 allows electrical cables or the like to pass therethrough. The cable pass-through 156 may be used in the passage of information from, e.g., one or more sensor to the controller system.

In one embodiment, air is removed from the vacuum chamber 112 to create negative pressure. By connecting the transfer star wheel 22 to the vacuum chamber 112 (see FIG. 7A), it is possible to apply a vacuum directly to the cans positioned on the transfer star wheel 22, which allows the cans to be held thereto in a horizontal arrangement.

The air manifold chamber 120 includes at least two access points 120a, 120b (see FIGS. 3A, 3B). A first air manifold chamber access point 120a positioned on one or more ends 53 of the base 50 may be used to allow the vacuum chamber 112 to communicate with adjacent bases for ease of operator access. When the multiple bases are used in a machine arrangement 10 (see FIGS. 1, 2), the first air manifold chamber access point(s) 120(a) at opposing ends of machine arrangement 10 typically have covers placed thereover to assist in sealing the air manifold chamber 120; the remainder of the first air manifold chamber access points 120a (i.e., having non-end positions on the machine arrangement 10) are open such that the air manifold chambers of the individual bases 50 of the machine arrangement are coupled to one another via the first air manifold chamber access points 120a. A second air manifold chamber access point 120b positioned at the top of the base 50 may be used by operators and/or maintainers to access plumbing, installation features, and the like during commissioning and operation. When not being used for such access (e.g., when the machine arrangement 10 is in use), the second air manifold chamber access point(s) 120b are typically closed and/or sealed with a suitable cover.

The vacuum chamber 112 likewise has at least two access points 112a, 112b. A first vacuum chamber access point 112a positioned on one or more sides 51a, 51b of the base 50 may be used by operators to remove obstructions and otherwise maintain a properly functioning vacuum path. When not being used for access to the vacuum chamber 112 (e.g., when the machine arrangement 10 is in use), the first vacuum chamber access points 112a are sealed with a suitable cover. A second vacuum chamber access point 112b positioned on one or more ends 53 of the base 50 may be used to allow the vacuum chamber 112 to communicate with adjacent bases to allow, e.g., a single blower to pull air from multiple bases. When the multiple bases are used in a machine arrangement 10 (see FIGS. 1, 2), the second vacuum chamber access point(s) 112(b) at opposing ends of the machine arrangement 10 typically have covers placed thereover to assist in sealing the vacuum chamber 112; the remainder of the second vacuum chamber access points 112b (i.e., having non-end positions on the machine arrangement 10) are open such that the vacuum chambers of the individual bases 50 of the machine arrangement are coupled to one another via the second vacuum chamber access points 112b.

The base 50 and, thus, each module 20, has a minimal footprint configured to save space in a factory or building in which the module 20 is used. Numerous modules 20 may be required for a single machine arrangement 10, and the smaller footprint of the base 50 permits the machine arrangement 10 to fit in a smaller space.

Each base 50 of the illustrated embodiments further includes a transfer star wheel opening 52 and a turret opening 54. A portion of the turret mechanism 60 may extend through the turret opening 54. In some embodiments, the portion of the turret mechanism 60 extending through the turret opening 54 connects to a turret gear (not shown) via a turret shaft 190 (see FIG. 7B). Turret gears that may be used with the embodiments described herein are described in U.S. Pat. No. 8,733,146, which is hereby incorporated by reference in its entirety.

In other embodiments, one or more servo motors 55a, 55b (see FIGS. 7A, 7B, 8A, 9A) is used to sync the movements of the turret 60 and the transfer star wheel 22. As such, the adjacent turrets and transfer star wheels do not have a physical connection but, rather, communicate via electronic means to ensure that they function in sync with one another. In the illustrated embodiments, the servo motors 55a, 55b are coupled to the rear of the respective turret 60 and transfer star wheel 22. It is contemplated, however, that the servo motors may be positioned in any suitable location.

Figure 7A:
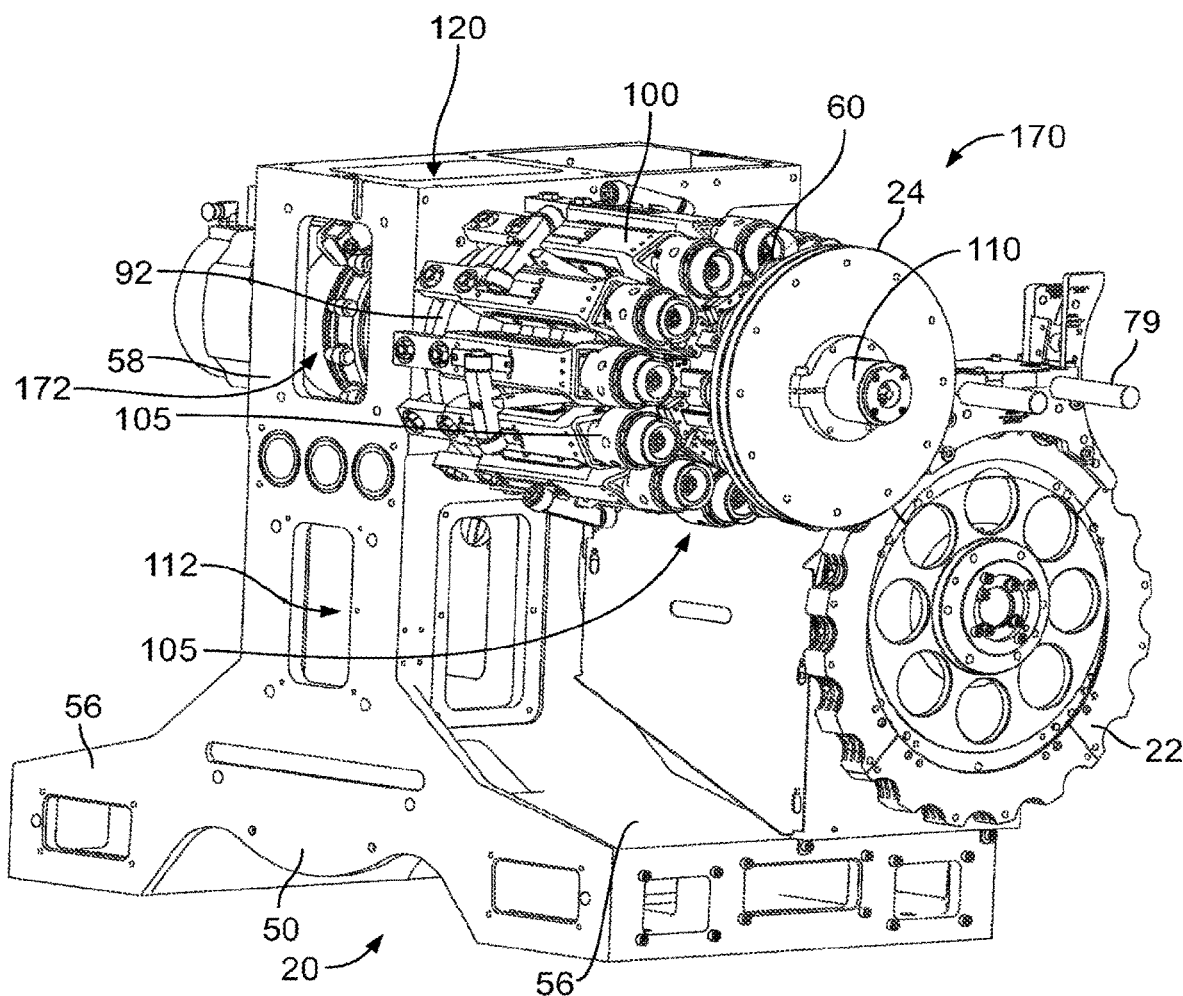
FIG. 7A is a perspective view of a symmetric base according to one embodiment with a turret and transfer star wheel coupled thereto.
Figure 7B:
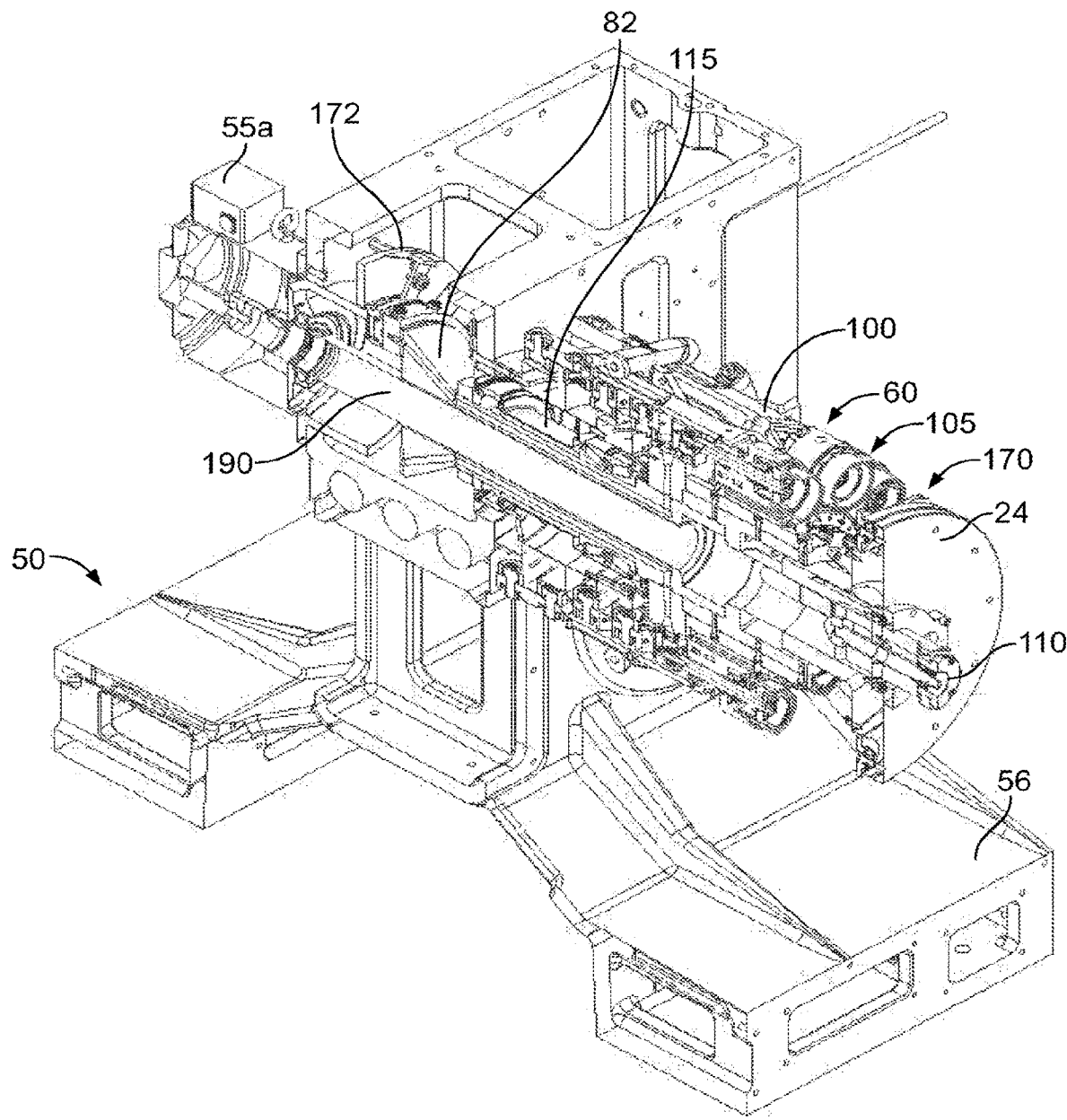
FIG. 7B is a cross-sectional view of the turret and symmetric base of FIG. 7A.
Figure 7C:
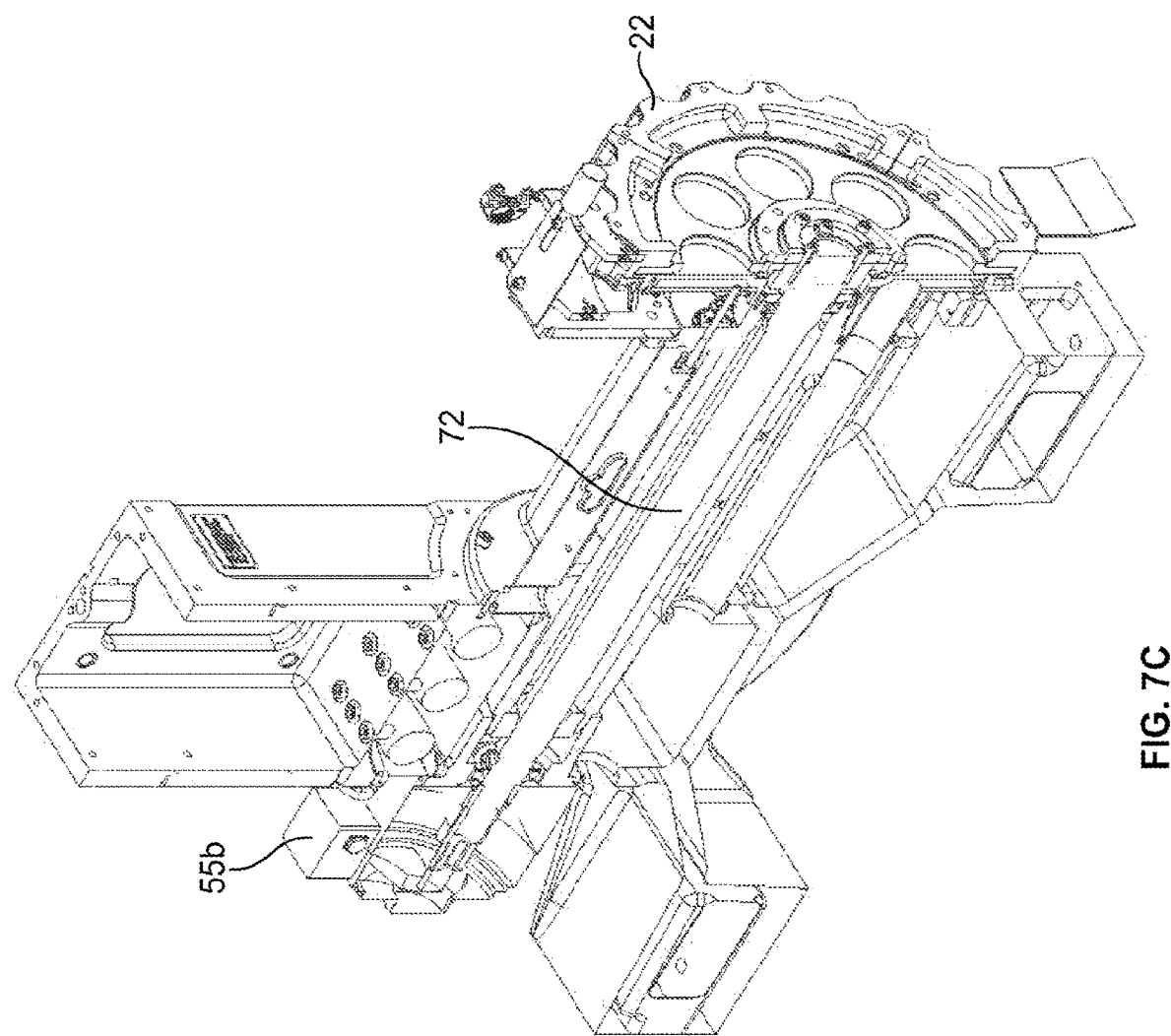
FIG. 7C is a cross-sectional view of the transfer star wheel and symmetric base of FIG. 7A.

As best seen in FIGS. 7A, 7B, and 9A, the turret 60 may be a cantilevered turret 60. Thus, the turret 60 may be supported at a base end portion 172 in the leg portion 58 of the base 50, as shown in FIGS. 7A and 7B. The turret star wheel 24 is attached to a working end portion 170 of the turret 60. The cantilevered working end portion 170 overhangs the foot portion 56 of the base 50. The turret 60 includes the turret shaft 190 and a turret star wheel shaft 110, which is at the working end portion 170 of the turret 60. In embodiments where turret gears are used, the turret shaft 190 may connect to the turret gear at the base end portion 172. The turret 60 further includes a bearing 115, dual ram assemblies 100, dual cams 92, and an air manifold 82, such as those shown in FIGS. 7A, 7B, and 8A.

Figure 9B:
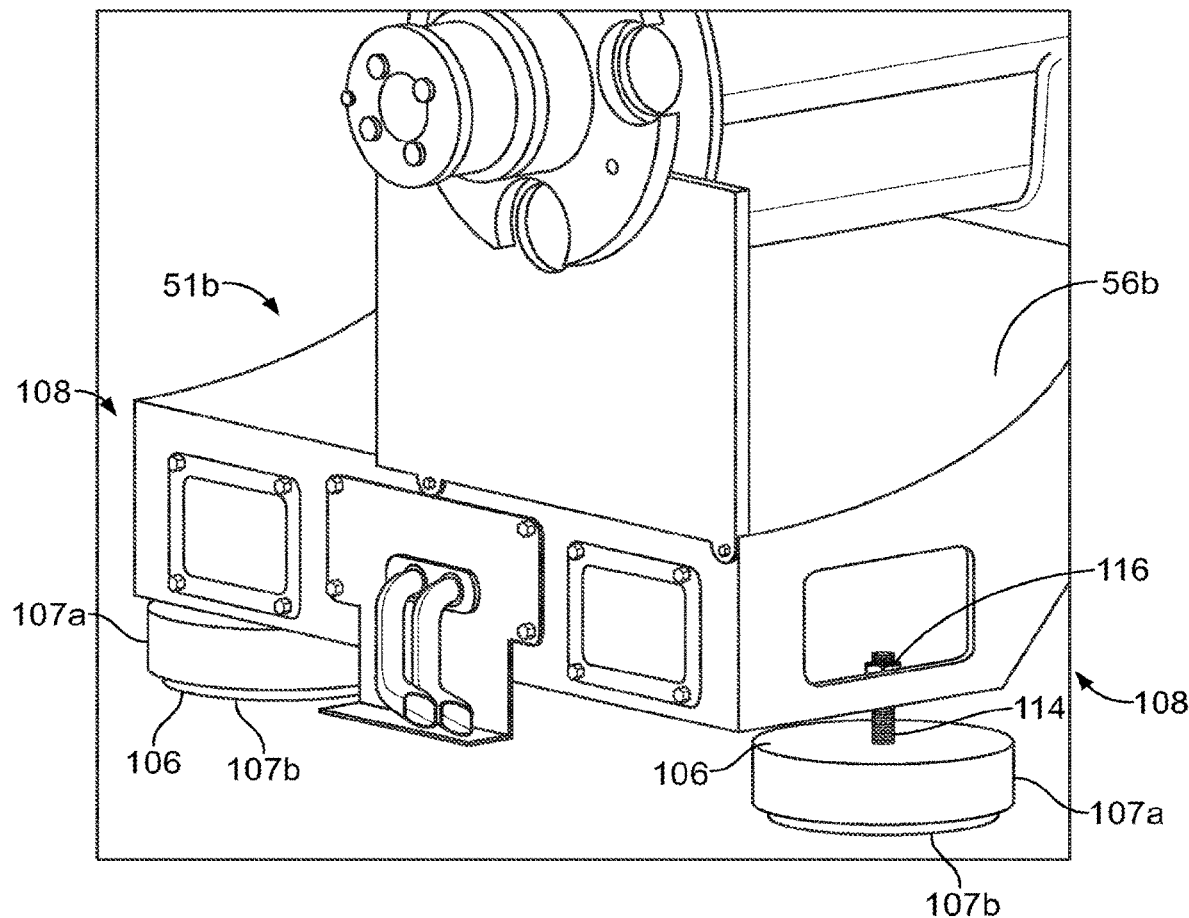
FIG. 9B is a perspective view of a foot portion of a base according to one embodiment.
Figure 10:
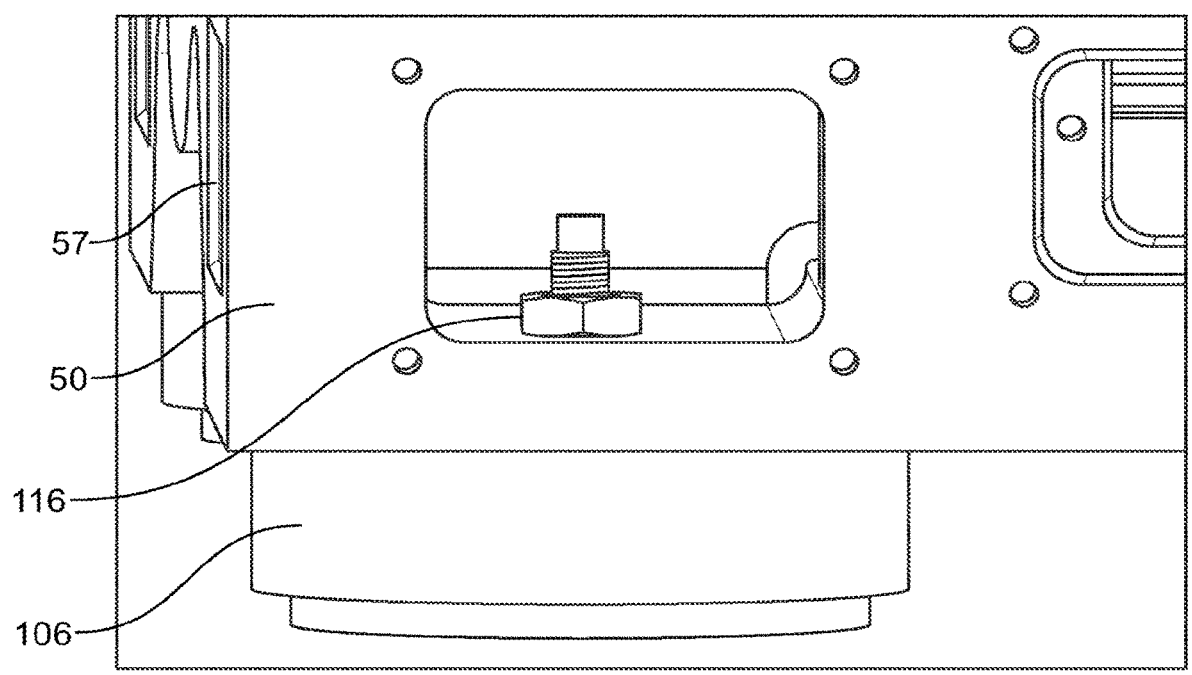
FIG. 10 is a side view of a symmetric base showing isolator pads being coupled thereto according to one embodiment.

Referring to FIG. 9A, 9B, isolator pads 106 are shown located on or near corner segments 108 of the foot portion 56a, 56b of the base 50. It is contemplated that the isolator pads 106 may be located in any suitable location on the base 50, e.g., in pre-drilled corner locations. Isolator pads 106 are important for minimizing machine vibration. Excess vibration may lead to erratic machine function. As shown in FIG. 9B, the isolator pads 106 described herein include one or more generally flat disc portions 107a, 107b, a threaded screw 114 extending generally through the central portion thereof, and a nut 116 adapted to mate with the screw 114. As shown in FIG. 10, the base 50 lies on the isolator pad 106, and the nut 116 lies within the base (e.g., within the forklift opening 57). By adjusting the position of the nut 116 with respect to the screw 114, the height of the foot portion 56a, 56b of the base 50 relative to the ground may likewise be adjusted.

Typically, there are only two isolator pads on a single base, and, as such, isolator pads are biased to one side. As such, existing bases may be unstable alone and may even be required to be restrained via a lifting device (e.g., overhead crane, forklift, or the like) until a second base can be mated to the first. In the non-limiting embodiment shown in FIG. 6B, there may be four isolator pads 106 arranged in a fashion at or near corners of the bottom of the base 50 that would create a rectangle if lines were drawn between their center points in sequence. This arrangement allows each base to be securely positioned before another base is attached to it. It is also contemplated that more than three isolator pads may also be used. In some embodiments, cast-in window openings 118 (see FIG. 3A) allow operators to access the isolator pads 106. This access allows for easy installation and fine adjustment of the isolator pads 106 to establish proper base height relative to the ground.

Figure 8A:
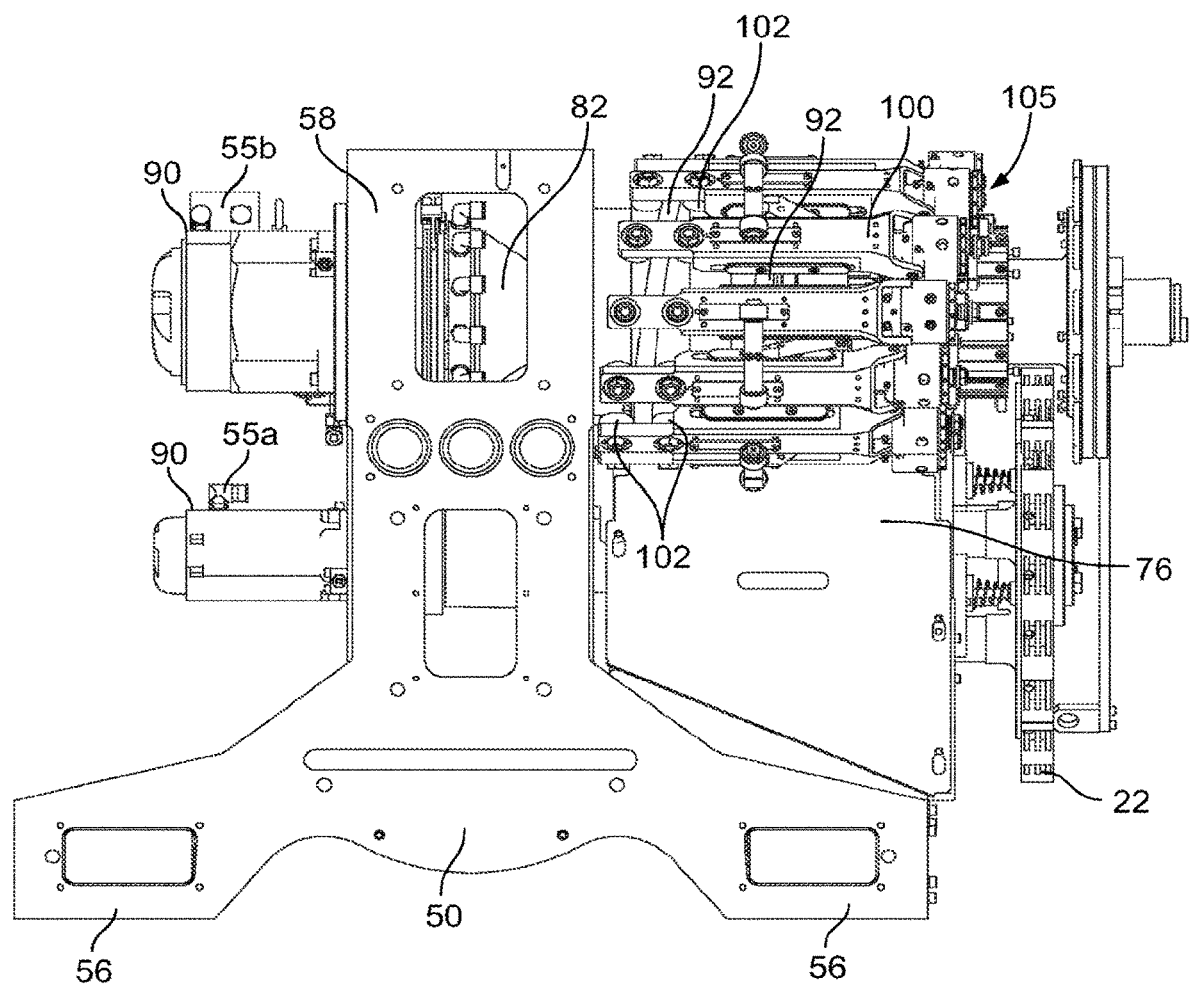
FIG. 8A is a side view of a symmetric base according to one embodiment with turrets coupled thereto.
Figure 8B:
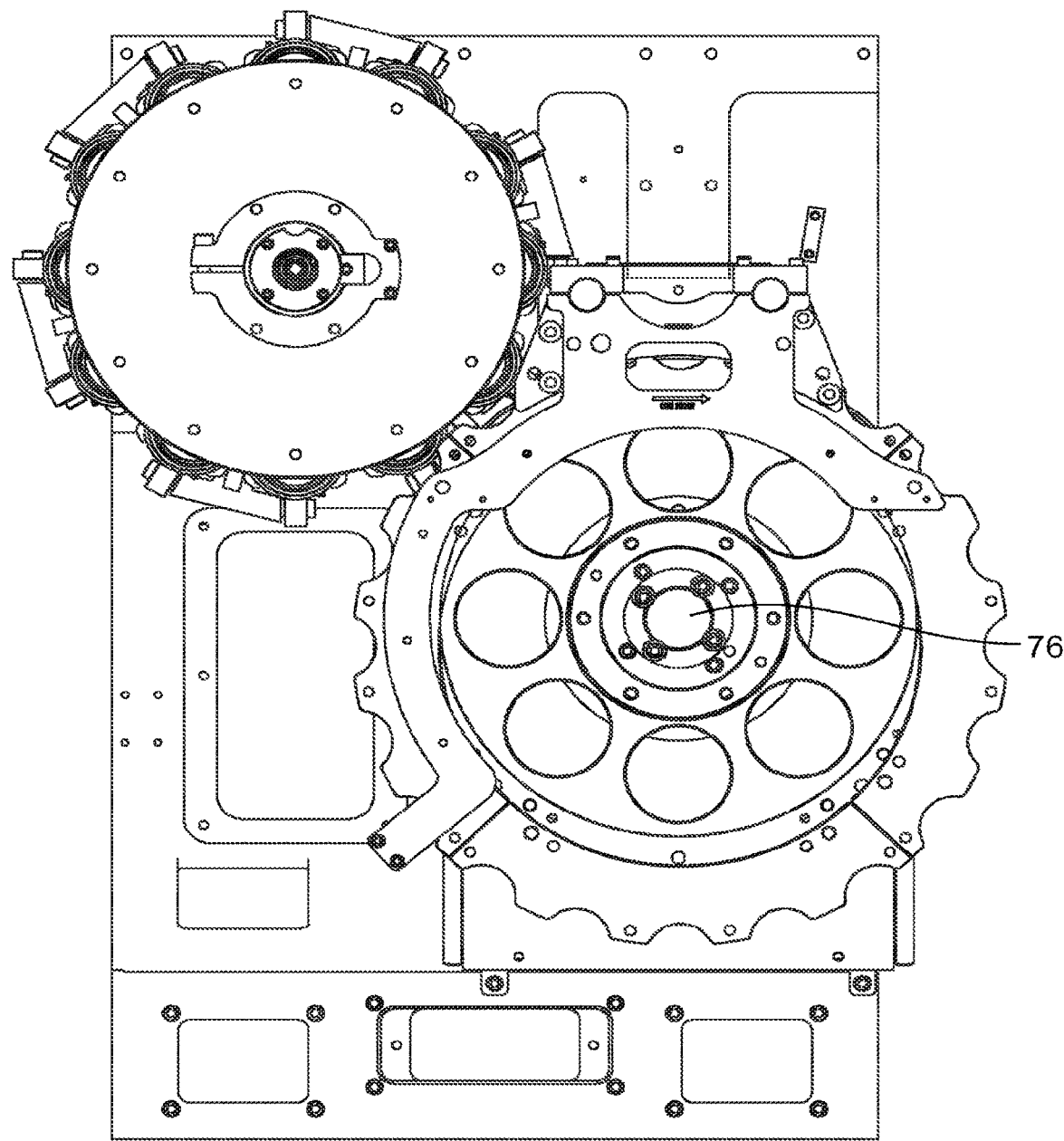
FIG. 8B is a front view of the symmetric base of FIG. 8A.

The dual ram assemblies 100 are positioned around the circumferential surface of the turret 60. As shown in FIG. 8A, each dual ram assembly 100 includes cam followers 102 that are configured to follow the path or surface of cams 92 positioned on a bearing 115 of the turret 60. Each ram assembly 100 includes tooling 105 to perform a necking or other working operation on the can 5. The tooling 105, for example, includes an inner knockout tool and an outer die tool (not shown). An open end of the can 5 is positioned in the pocket 24A so that the tooling 105 is positioned appropriately to be inserted into and/or around the open end of the can 5 so that the tooling 105 performs the necking or other suitable working operation.

As the cam followers 102 follow their respective cam surfaces 92, the tooling 105 slides toward or away from a can 5 to be worked on in a corresponding pocket 24A of the turret star wheel 24. When the tooling 105 reaches the can 5, the tooling 105 performs a necking operation on the can 5, and then withdraws as the cam followers 102 continue following the path of their respective cam surface 92. As can be seen in FIG. 8A, each dual ram assembly 100 includes two sets of cam followers 102 that each follow a different cam 92 on the turret 60. The cams 92 are arranged so that the cans 5 follow a 270-degree path around the turret 60.

The transfer star wheel 22, the turret 60, the tooling 105, and the corresponding turret star wheel 24 are arranged so that the cans 5 do not move in an axial direction toward and away from the tooling 105 or turret 60. Rather, the cans merely rotate around the turret 60, while the dual ram assemblies 100 and corresponding tooling 105 move in an axial direction toward and away from the cans 5. It is contemplated, however, that in other embodiments, the cans move in an axial direction while axial position of the tooling remains generally stationary. In yet other embodiments, both the cans and the tooling move axially toward one another.

As noted above, each base 50 is generally symmetric about a center line drawn through the midpoint of the vertical section of the base between the first foot portion 56a and the second foot portion 56b. This symmetry makes it possible to consider either side of the base the rear of the base. This allows mating parts to be mounted on either side. The base of the present invention carries out all of the functions of a traditional modular base but is serviceable for both "normal rotation" and "reverse rotation" applications and thus eliminates the need for bases designated as "right hand," "left hand," "normal rotation" or "reverse rotation." Moreover, each symmetric base is modular and can be connected to other bases (see FIG. 9B) to form a complete machine system, or the base can be used as a complete system by itself.

By using a single, symmetric base for normal and reverse rotation, turrets and drive components can be readily mounted on either face of the base to create "normal" or "reverse" rotation equipment, and either configuration can be assembled using a single base part or base assembly. Thus, a symmetric base that offers both normal and reverse rotation may allow customers to forecast base needs in advance of normal operations. This also allows purchase of a single part in bulk, thereby reducing the cost of the base. Also, stocking of a single part number simplifies operations and allows for more flexibility, as relocated machines may be readily changed from "normal" to "reverse" rotation to suit a particular facility. Moreover, a large number of components may be eliminated and additional cost and/or complexity can be reduced or eliminated from the system. A symmetric base also allows for integration of previously freestanding dropped can evacuation systems into the base. The design of the symmetric base also allows for lifting and/or moving the base (via forklift or similar methods) from all four sides/ends of the base.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," "attached," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the Figures. It should be noted that the orientation of various elements may differ according to other exemplary embodiments, and that such variations are intended to be encompassed by the present disclosure.

It is important to note that the construction and arrangement of the machine module and/or machine arrangement as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes, and omissions may also be made in the design, operating conditions, and arrangement of the various exemplary embodiments without departing from the scope of the present invention.

What is claimed is:

1. A symmetric, modular base for a can processing system, the base comprising:
    a leg portion comprising a plurality of openings on first and second sides thereof, the plurality of openings being adapted for receiving at least one of a transfer star wheel and a turret mechanism configured to perform a working operation on an article;
    a first foot portion extending from the first side of the leg portion in a first direction;
    a second foot portion extending from the second side of the leg portion in a second direction, the second direction being generally opposite the first direction;
    one or more gussets configured to support the transfer star wheel and the turret mechanism, the one or more gussets extending upward from each of the first and second foot portions toward the leg portion; and
    a plurality of openings in the first foot portion and the second foot portion, the plurality of openings of the first and second foot portion providing access to an interior portion of the base,
    wherein the base is generally symmetric about a center line drawn vertically through a midpoint of the leg portion of the base between the first foot portion and the second foot portion to allow for mounting of components on either a first side or a second side of the base.

2. The base of claim 1, further comprising one or more isolator pads coupled to a bottom of the base, the one or more isolator pads being configured to adjust the height of the base.

3. The base of claim 1, further comprising a turret star wheel on the turret mechanism.

4. The base of claim 1, further comprising one or more servo motors configured to sync the movement of the turret mechanism and the transfer star wheel.

5. The base of claim 1, wherein the plurality of openings of the first and second foot portions includes openings adapted to receive fork-lift prongs extend from one end of a respective one of the first and second foot portions to a generally opposite end thereof.

6. A machine arrangement which operates on a plurality of articles comprises:
    a plurality of machines arranged to cooperate with each other in a manner to form a machine arrangement, wherein each machine in the plurality of machines includes
        a transfer star wheel,
        a turret mechanism configured to perform a working operation on an article, and
        a symmetric, modular base having a leg portion, a first portion extending from a first side of the leg portion in a first direction, and a second portion extending from a second, generally opposing side of the leg portion in a second direction, the second direction being generally opposite the first direction, each of the first and second sides of the leg portion having apertures for receiving at least a portion of the transfer star wheel and the turret mechanism,
    wherein the base is symmetric about a center line drawn vertically through a midpoint of the base between the first side and the second side to allow for receiving the transfer star wheel and the turret mechanism in the aperture on either the first side or the second side of the base.

7. The machine arrangement of claim 6, wherein each of the machines in the plurality of machines is modular in design.

8. The machine arrangement of claim 7, wherein each modular base includes a plurality of openings configured to receive fork lift prongs.

9. The machine arrangement of claim 6, wherein each modular base comprises a first foot portion and a second foot portion extending from a respective one of the first and second sides.

10. The machine arrangement of claim 9, wherein each modular base further comprises one or more gussets for supporting the transfer star wheel and the turret mechanism, each of the one or more gussets extending upwards from each of the first and second foot portions toward the respective first or second side.

11. The machine arrangement of claim 6, further comprising one or more isolator pads coupled to a bottom of the base, the one or more isolator pads being configured to adjust the height of the base.

12. The machine arrangement of claim 6, further comprising one or more servo motors configured to sync the movement of the turret mechanism and the transfer star wheel.

* * * * *